United States Patent

Marsala

[11] Patent Number: 5,985,009
[45] Date of Patent: Nov. 16, 1999

[54] AUTOMATIC CARPET CLEANING WASTE WATER DISPOSAL APPARATUS

[76] Inventor: Vincent J. Marsala, 111 Bradley St., West Monroe, La. 71291

[21] Appl. No.: 08/997,828

[22] Filed: Dec. 24, 1997

Related U.S. Application Data

[60] Provisional application No. 60/049,302, Jun. 11, 1997, abandoned.

[51] Int. Cl.$^6$ .................................................. B01D 47/02
[52] U.S. Cl. ................................ 96/250; 15/353; 55/423; 55/425; 55/DIG. 3; 96/265; 96/278; 96/337
[58] Field of Search ................................ 55/DIG. 3, 423, 55/424, 425, 428; 95/226; 96/278, 329, 337, 265, 250; 15/353

[56] References Cited

U.S. PATENT DOCUMENTS

| | | | |
|---|---|---|---|
| 2,549,181 | 4/1951 | Durham | 55/DIG. 3 |
| 2,609,190 | 9/1952 | Jackson | 55/DIG. 3 |
| 3,048,875 | 8/1962 | Bottinelli et al. | 15/353 |
| 3,173,164 | 3/1965 | Congdon | 15/353 |
| 3,618,297 | 11/1971 | Hamrick | 55/DIG. 3 |
| 3,706,184 | 12/1972 | Tucker | 55/DIG. 3 |
| 3,942,217 | 3/1976 | Bates | 15/321 |
| 3,942,963 | 3/1976 | Tevis | 55/DIG. 3 |
| 4,226,000 | 10/1980 | Tribolet | 15/321 |
| 4,800,612 | 1/1989 | Valentine | 15/314 |
| 4,823,428 | 4/1989 | Sevigny | 15/302 |
| 5,017,201 | 5/1991 | Park | 55/DIG. 3 |
| 5,134,748 | 8/1992 | Lynn | 15/353 |
| 5,242,588 | 9/1993 | Reese | 55/DIG. 3 |
| 5,378,354 | 1/1995 | Poor | 55/DIG. 3 |
| 5,618,410 | 4/1997 | Wallace et al. | 210/123 |

FOREIGN PATENT DOCUMENTS 3739731  6/1989  Germany .

*Primary Examiner*—Duane S. Smith
*Attorney, Agent, or Firm*—Richard C. Litman

[57] ABSTRACT

A versatile waste disposal apparatus for separating and disposing the liquid waste from vacuum cleaning of soiled carpets. The air, liquid and accumulated dirt in a mixture from a conventional vacuum cleaner are separated in one large tank, and the filtered liquid is passed on either to an integrated or non-integrated smaller tank with cutoff, air venting, and pump controls. The filtered liquid is ultimately passed on to a wastewater system so that the tanks are empty after use. The waste disposal apparatus can be integrated with a dwelling's central vacuuming system and operated on house current. The apparatus can be installed in a vehicle and powered by the vehicle's battery.

8 Claims, 2 Drawing Sheets

AUTOMATIC CARPET CLEANING WASTE WATER DISPOSAL APPARATUS

CROSS-REFERENCE TO RELATED APPLICATION

This application claims the benefit of U.S. Provisional Patent Application Ser. No. 60/049,302, filed Jun. 11, 1997 now abandoned.

BACKGROUND OF THE INVENTION

1. Field of the Invention

The present invention relates to an automatic continuous carpet cleaning waste water disposal apparatus, for either commercial use by professional carpet cleaners or homeowners with a central vacuum system. A large capacity primary tank collects the waste liquid and air continuously from a cleaning wand during the cleaning of soiled carpets, separates the liquid from the gas, and filters both materials. Then the filtered liquid is passed to a smaller capacity secondary tank, wherein the liquid is continuously disposed by a pump to a wastewater drain. The secondary tank is equipped with an automatic slide valve for closing off the flow from the primary tank when the secondary tank is overloaded. The secondary tank has an air vent and a float with a cutoff switch for stopping the pump when the liquid level has reached a minimum level. The two tanks can be integrated and used in the home or separated with the large tank outside the home in a vehicle. The versatile system can be operated on 12 V. D.C. (vehicle) or 115 V. A.C. (dwelling).

2. Description of Related Art

The following related art describes various machinery and modes of operation in disposing of liquid waste. However, there is a failure to recognize the versatility of a disposal apparatus that can be either operated in situ or in part outside the building being cleaned. The related art fails to describe a relatively maintenance free apparatus which requires only periodic washing out of the tanks. The advantage of leaving a job site with emptied tanks in the vehicle or cleaning apparatus is not seen in most of the related art.

The related art of interest will be discussed in the order of perceived relevance to the present invention.

U.S. Pat. No. 4,800,612 issued on Jan. 31, 1989, to Edward R. Valentine describes a vacuum power booster with automatic waste liquid discharge for a carpet cleaning water vacuum extraction apparatus. The dirty waste liquid from the vacuum pickup wand is conducted by vacuum to a mobile second waste liquid storage tank adjacent to the pickup wand for filtering and expulsion of air by an overhead vacuum pulling motor. The liquid level in the second tank is maintained either automatically by the positions of the inlet and outlet ports or a float and switch device to open an outlet valve when the liquid level is high. The filtered liquid is conducted to the first tank located outside the building in a vehicle and back directly to the cleaning wand. No volume capacities of either tank are disclosed. The first tank is housed with a cleaning solution storage tank from which the cleaning solution is apparently added to the recycled liquid. Other monitors on the first tank are gauges for fluid flow and pressure. Also, air is exhausted to the atmosphere from the first tank. It is clear that only two separated liquid tanks are contemplated with recycling of the cleaning liquid in the system. Therefore, this reference is distinguished by not discharging the filtered but dirty fluid into a sewer system and the requirement of two vacuum sources.

U.S. Pat. No. 3,942,217 issued on Mar. 9, 1976, to Jack A. Bates describes a carpet cleaning machine comprising a wet vacuum pickup wand, a main collector tank integrated within the cleaning fluid reservoir on a cart and an auxiliary collecting tank on a separate stand/cart for separation of the residue. The upright barrel-shaped auxiliary collecting tank receives the dirty cleaning fluid from the wand, and recycles the fluid when the fluid level reaches the top of the tank to the main collector tank. When the collected sediment reaches the top of the auxiliary collecting tank, the tube from the wand is connected to the main collector tank and the dirty liquid is recycled and collects in the main collector tank. Power for liquid flow and vacuum pull is supplied by a motor driving a pump and a blower on the cart. This system requires the two collecting tanks to move with the cleaning wand, whereas the present invention utilizes stationary collection tanks.

U.S. Pat. No. 4,823,428 issued on Apr. 25, 1989, to Conrad Sevigny describes a waste liquid disposal apparatus for an industrial floor cleaning system with detergents. The collection tank has an overhead vacuum pump which vacuums waste water from the cleaning machine for disposal into a tank. When the waste water reaches a predetermined level as determined by a set of three electrodes and a control unit, the tank on the toilet bowl empties automatically into a toilet. An additional apparatus supplies the detergent to the water coming from a water tap, which is pumped under pressure to the mobile floor cleaning unit. This reference is distinguished (1) by having only one collection tank, (2) requiring the use of the toilet bowl or a permanent fixture to a water plug drain for disposal of the detergent containing waste water, and (3) requiring the use of the detergent-mixing apparatus.

U.S. Pat. No. 4,226,000 issued on Oct. 7, 1980, to Herbert Tribolet describes a wet and dry vacuum cleaning system using hot water from a tap. A vacuum motor in a wheeled canister pulls a vacuum through a first dirty water tank and the cleaning wand. Apparently, enough vacuum is applied to suck a supply of cleaning water from a second tank in the sink and connected to the water tap. The first tank can be placed on top of and combined with the wheeled vacuum pulling canister. The collected dirty water is not filtered but disposed of when the first dirty water tank is full. The reference is further distinguished by its requirement of a hot water faucet.

U.S. Pat. No. 5,618,410 issued on Apr. 8, 1997, to George M. Wallace et al. describes an automatically draining vacuum apparatus for a dry vacuum apparatus of a dental aspirator. The apparatus requires a float to partially block a vacuum port to create a second vacuum force which is less than the first vacuum force to allow the fluid to drain to restore the first vacuum force. The apparatus is distinguished by its multiple walled structure and reliance on a specific use for dental aspiration.

German Patent Application No. DE 3,739,731 A1 published on Jun. 15, 1989, for Peter Worwag describes a spray extraction carpet cleaning apparatus using electric motors in the cover of the wheeled cleaning fluid canister to drive the pump for application of cleaning fluid, and in the cover of wheeled dirty liquid canister to drive the suction pump for subsequent removal and recycle of the soiled liquid. As best understood, there is no filtration of the sediment from the dirty liquid. In fact, the perforated collection head in the dirty liquid tank rests on the bottom where the sediment is expected to settle. The reference provides for the interchangeability of the covers with its apparatus to be utilized on only one canister, and the wheeled canisters would not be capable of holding a large volume of dirty liquid in the primary tank.

None of the above inventions and patents, taken either singly or in combination, is seen to describe the instant invention as claimed.

SUMMARY OF THE INVENTION

An automatic continuous carpet cleaning waste water disposal apparatus for either commercial use by professional carpet cleaners or homeowners with a central vacuum system is contemplated. A large capacity primary tank collects the waste liquid and air continuously from a cleaning wand during the cleaning of soiled carpets, separates the liquid from the gas, and filters both materials. The filtered liquid is then passed to a smaller capacity secondary tank, wherein the liquid is continuously disposed by a pump to a wastewater drain. The secondary tank is equipped with an automatic slide valve for closing off the flow from the primary tank when the secondary tank is overloaded. The secondary tank has an air vent and a float with an automatic cutoff switch for stopping the pump when the liquid level has reached a minimum level. The two tanks can be integrated and used in the home or separated with the large tank outside the home in a vehicle. This versatile system can be operated on either 12 V. D.C. in a vehicle or 115 V. A.C. in a dwelling.

Accordingly, it is a principal object of the invention to provide a carpet cleaning waste disposal apparatus which filters and separates the liquid from the gas in a primary tank and passes the liquid to a smaller secondary tank for disposal to a wastewater system.

It is another object of the invention to provide a carpet cleaning waste disposal apparatus which continuously empties the liquid in the primary tank to a smaller secondary tank with cutoff, gas vent, float, and pump controls.

It is a further object of the invention is to provide the versatility of a carpet cleaning waste disposal apparatus either partially located in a vehicle or combined with a dwelling's vacuum system.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention provides for a versatile carpet cleaning liquid waste removal apparatus which filters out the solids from the liquid which is discharged to a sewer.

Figure 1:
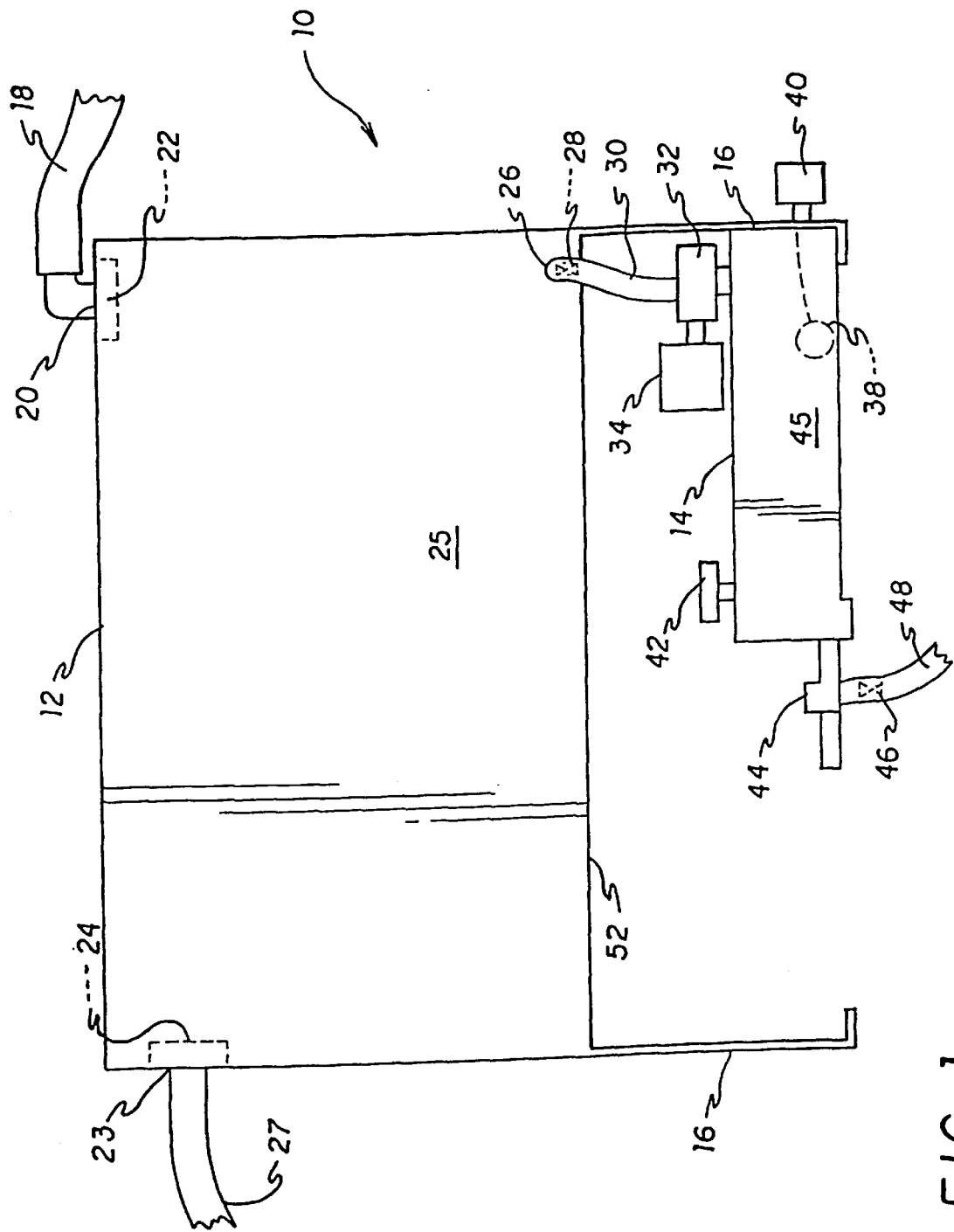
FIG. 1 is a schematic view of the first embodiment of the present invention depicting an integrated two-tank apparatus.

In the first embodiment of FIG. 1, a waste water disposal apparatus 10 comprises a large primary collection tank 12 disposed over a small secondary collection tank 14. The tank 12 is preferably rectangular in shape and supported by four legs or walls 16. The dirty water from one or more carpet cleaning wands is sucked through an influent hose 18 into one end of the top of the primary tank having an exemplary capacity of 35 gallons. A waste collection filter 20 is attached to the upper influent port 22 for accepting and separating any dirt particles from the waste water.

At the opposite end of the tank 12 proximate to the top a vacuum is pulled by a blower device or a vacuum pump (not shown) at the upper effluent port 23 to suck the dirty liquid and air mixture into the tank 12. An air filter 24 covers the effluent port 23. Tank 12 thus serves to filter out the solids from the dirty liquid and air mixture and effect a separation of the liquid 25 from the entrapped air 27 exiting through the upper effluent port 23.

A bottom outlet port 26 for the tank 12 is equipped with a drain valve 28 for manual control if necessary. The dirty water is transported by the connection hose 30 through a horizontally aligned slide valve 32 (3-inch diameter size rod with an external handle) controlled by an actuator device 34 before entering the secondary collection tank 14. The secondary tank 14 is equipped with a float 38 which trips a float switch 40 when the water level is excessive. The float switch 40 then activates the actuator device 34 and the slide valve 32 to automatically close off the water supplied from the primary tank 12. An air venting pressure valve 42 positioned on top of the secondary tank 14 is calibrated for the relief of excessive air pressure within the secondary tank.

A centrifugal water pump 44 is connected to an end opposite from the float switch 40 for expelling the water 45 from the secondary tank 14. A check valve 46 is conveniently located on the outlet hose 48 to prevent any backup of the filtered dirty water going to the wastewater drain or the like.

Thus, this waste water disposal apparatus 10 can pump out whatever quantity of dirty water regardless of the limited vacuum power issuing from the carpet cleaning device(s). The size of the apparatus can be variable in that the carpet cleaning liquid waste removal apparatus 10 can be small and combined with a vacuuming unit, or large enough to be separated from the vacuuming unit and mounted on a vehicle. An intermediate sized apparatus 10 can even be combined with the in situ centralized vacuum system found in many modern dwellings.

Figure 2:
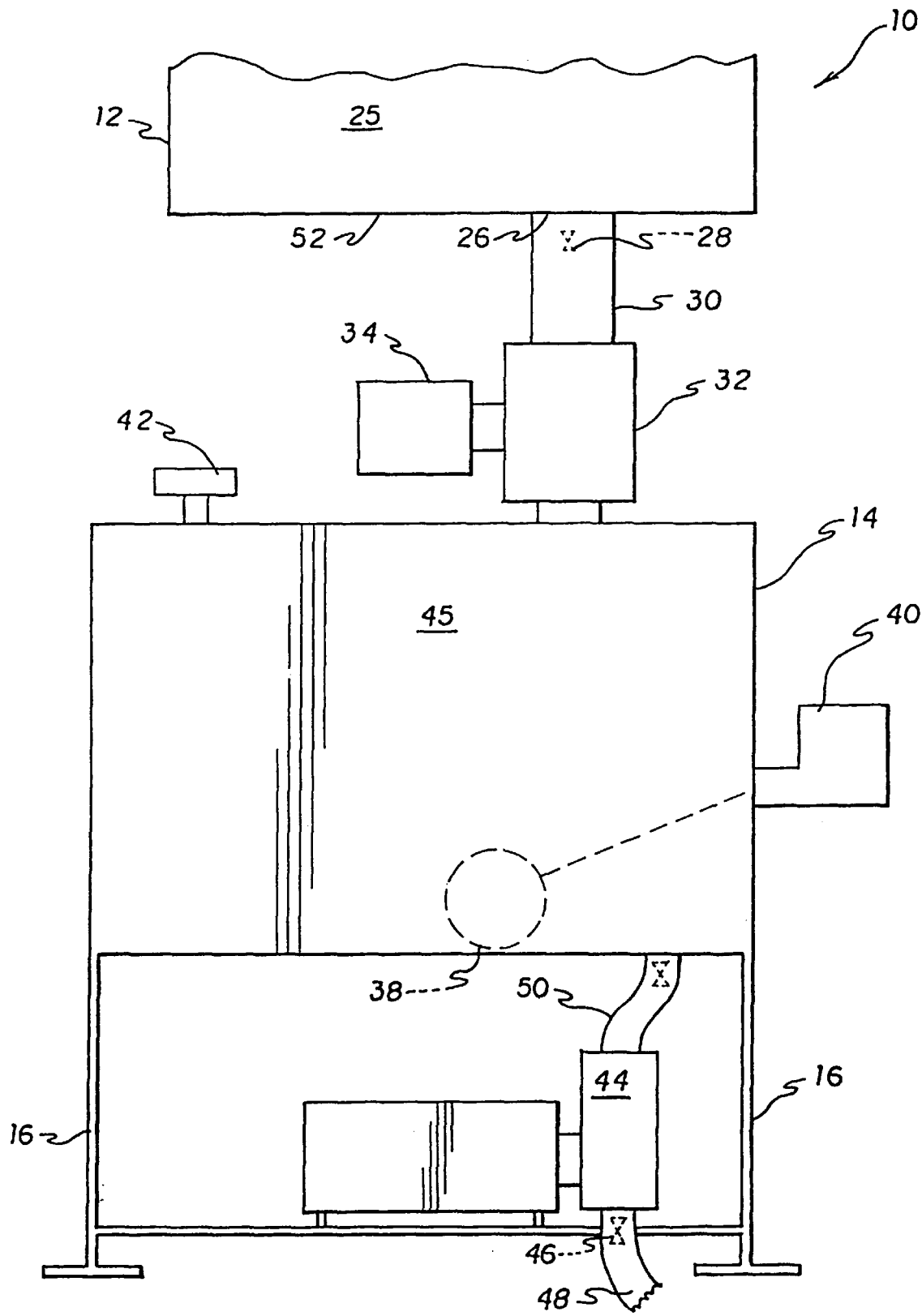
FIG. 2 is a schematic view of the second embodiment of the present invention illustrating a separated two-tank apparatus.

FIG. 2 depicts the second embodiment of the present invention wherein the centrifugal pump 44 is located below the secondary collection tank 14 to receive the filtered dirty water through the outlet hose 50. Similarly, the bottom outlet port 26 of the primary collection tank 12 has been relocated on the bottom surface 52. Thus, the ability to empty out the secondary collection tank 14 completely has been enhanced.

It should be noted that both the primary and secondary collection tanks 12 and 14, respectively, have suitable removable covers on top or on the side for access to the interior for replacement of the waste collection filter 20 and the air filter 24. It has been found that cleaning of the interior of the collection tanks 12 and 14 is not rigorous or difficult, because filters 20 and 24 are provided.

The advantages of the present invention are significant. The carpet cleaner operator will save time by not having to stop to empty any containers until the cleaning job is completed. The operator need not carry the dirty water accumulated in the conventional apparatus out and back to the vehicle. The present inventive apparatus can be quickly connected and disconnected to any carpet cleaning device in a matter of seconds. Finally, the present invention will allow the vacuuming operator to reduce significantly the size of the existing waste tank held in a vehicle.

It is to be understood that the present invention is not limited to the embodiments described above, but encompasses any and all embodiments within the scope of the following claims.

I claim:

1. A carpet cleaning liquid waste removal apparatus comprising:

a larger capacity primary tank having an upper influent port with a waste collection filter for accepting and separating a waste liquid and air mixture stream from a vacuuming unit;

said primary tank having an upper effluent port with a vacuum filter for passage of the cleaned air to the environment and a bottom effluent port for passage of the waste liquid;

a smaller capacity secondary tank having a connecting hose, a slide valve, an automatic actuator relay for said slide valve and an influent port, said connecting hose passing from the said primary tank bottom effluent port to said slide valve with said automatic actuator relay, and to said influent port of said secondary tank;

said secondary tank having an air vent valve, a float-operated switch, and an effluent port; and a centrifugal pump adapted to empty said waste liquid to a hose, said hose being equipped with a check valve;

whereby the large primary tank effects separation of the incoming waste liquid-air mixture with filtering of the waste and air and passes the filtered waste water to said smaller secondary tank for continuous disposal to a wastewater drain.

2. The apparatus according to claim 1, wherein said primary tank and said secondary tank are configured as an integrated, one-unit system.

3. The apparatus according to claim 2, said system being configured for installation in a dwelling.

4. The apparatus according to claim 3, said system being configured for operation on 115 V. A.C.

5. The apparatus according to claim 1, said primary tank and said secondary tank being configured as a separated, two-unit system.

6. The apparatus according to claim 5, said primary tank being located on a vehicle and configured to being operated on a 12 V. D.C. battery of said vehicle.

7. The apparatus according to claim 5, said secondary tank being located in a dwelling and configured to being operated on 115 V. A.C.

8. The apparatus according to claim 1, said slide valve having a diameter of three inches and further comprising a handle actuated by said automatic actuator relay.

* * * * *